No. 775,709. PATENTED NOV. 22, 1904.
G. C. PYLE.
MACHINE FOR MAKING HOLLOW GLASSWARE.
APPLICATION FILED JAN. 14, 1903.
NO MODEL. 10 SHEETS—SHEET 5.

WITNESSES:
Harry I. Pearce
Nellie Allemong

INVENTOR
George C. Pyle,
BY
V. H. Lockwood,
ATTORNEY

No. 775,709. PATENTED NOV. 22, 1904.
G. C. PYLE.
MACHINE FOR MAKING HOLLOW GLASSWARE.
APPLICATION FILED JAN. 14, 1903.
NO MODEL. 10 SHEETS—SHEET 7.

WITNESSES:
Harry J Pearce
Nellie Allemong

INVENTOR
George C. Pyle.
BY
V. H. Lockwood.
ATTORNEY

No. 775,709. PATENTED NOV. 22, 1904.
G. C. PYLE.
MACHINE FOR MAKING HOLLOW GLASSWARE.
APPLICATION FILED JAN. 14, 1903.
NO MODEL. 10 SHEETS—SHEET 8.

WITNESSES: INVENTOR
Harry I Pearce George C Pyle
Nellie Allemong BY
V. H. Lockwood
ATTORNEY No. 775,709. PATENTED NOV. 22, 1904.
G. C. PYLE.
MACHINE FOR MAKING HOLLOW GLASSWARE.
APPLICATION FILED JAN. 14, 1903.
NO MODEL. 10 SHEETS—SHEET 9.

WITNESSES:
Harry J. Pearce
Nellie Alkemony

INVENTOR
George C. Pyle
BY
V. H. Lockwood
ATTORNEY

No. 775,709. PATENTED NOV. 22, 1904.
G. C. PYLE.
MACHINE FOR MAKING HOLLOW GLASSWARE.
APPLICATION FILED JAN. 14, 1903.
NO MODEL. 10 SHEETS—SHEET 10.

WITNESSES:
Harry J Pearce
Nellie Allemong

INVENTOR.
George C Pyle
BY
V. H. Lockwood
ATTORNEY.

No. 775,709. Patented November 22, 1904.

UNITED STATES PATENT OFFICE.

GEORGE C. PYLE, OF INDIANAPOLIS, INDIANA.

MACHINE FOR MAKING HOLLOW GLASSWARE.

SPECIFICATION forming part of Letters Patent No. 775,709, dated November 22, 1904.

Application filed January 14, 1903. Serial No. 138,984. (No model.)

*To all whom it may concern:*

Be it known that I, GEORGE C. PYLE, of Indianapolis, county of Marion, and State of Indiana, have invented a certain new and useful Improvement in Machines for Making Hollow Glassware; and I do hereby declare that the following is a full, clear, and exact description thereof, reference being had to the accompanying drawings, in which like numerals refer to like parts.

The invention herein set forth consists of improvements made in machines for making hollow glassware, such as are set forth in Letters Patent of the United States heretofore obtained by me, including the following: No. 647,276, dated April 10, 1900; No. 650,655, dated May 29, 1900; No. 668,858, dated February 26, 1901; No. 672,987, dated April 30, 1901; No. 675,166, dated May 28, 1901, and No. 714,396, dated November 25, 1902.

The nature of this invention will be understood from the following description and claims and the accompanying drawings of a machine embodying said improvements.

In the drawings illustrating this invention.

The machine is mounted on a movable base 1, that is carried by suitable trucks. Upon the front part of said frame a hollow column 2 is secured, which carries a vertical post 3, held in place by set-screws 4. A gear-wheel 5 is mounted horizontally rotatable on said post 3 and rests upon the upper end of the hollow column 2. Said gear-wheel 5 carries a series of receiving-molds 6, that rest in a cylindrical casing 7, which is secured to the gear-wheel by the ears 8 and bolts 9. The receiving-molds are insertible into the casing 7 from the top and are held therein by an inwardly-turned lip at the lower end of the casing, as appears in Fig. 8.

Figure 8:
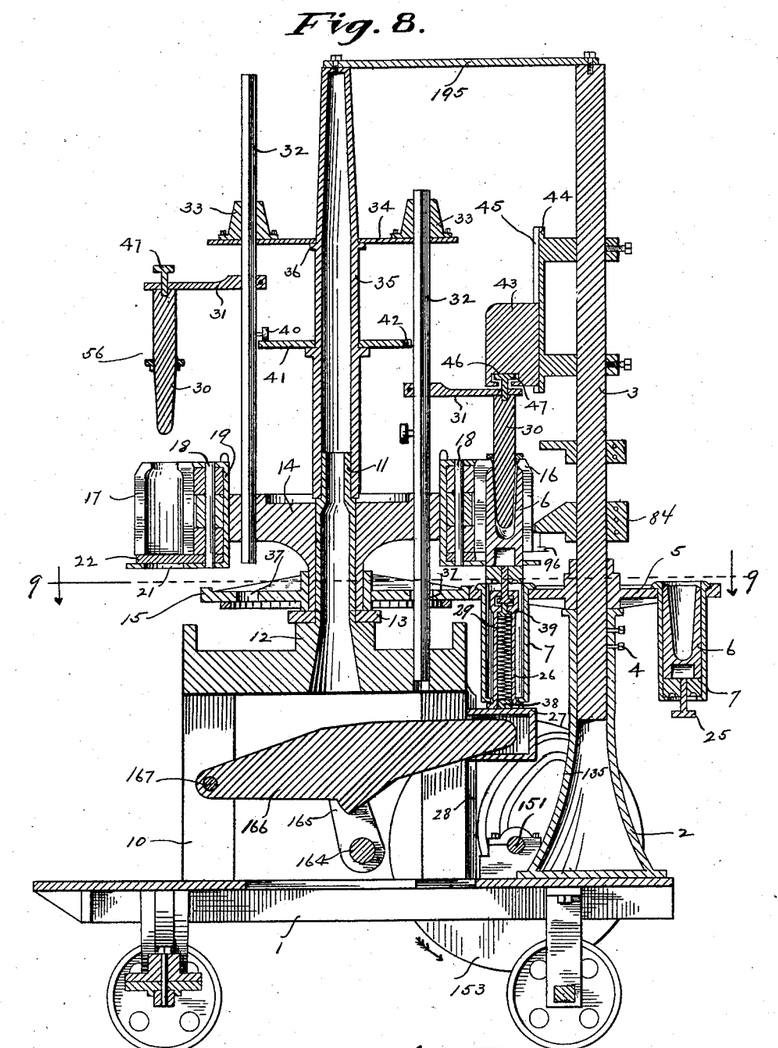
Fig. 8 is a central vertical section through the machine from front to rear.
Figure 13:
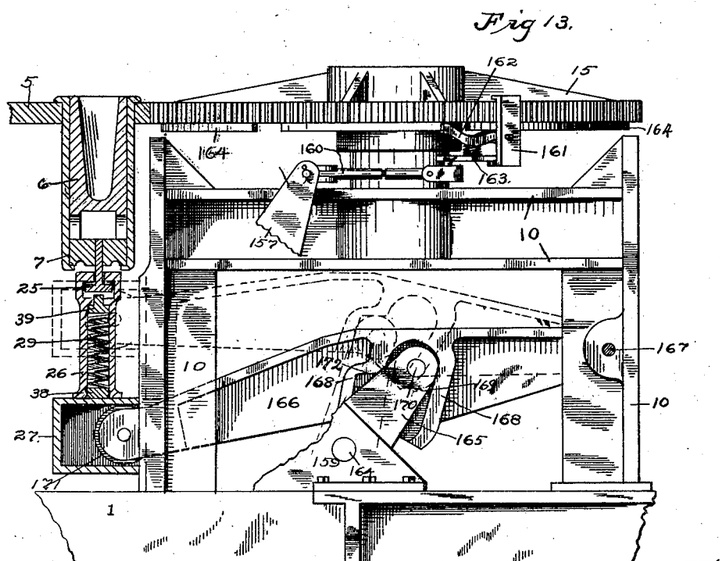
Fig. 13 is a detail drawing showing an elevation of the right-hand side of the stationary frame and the means for elevating the receiving-molds and in cross-section a receiving-mold and a portion of the means for carrying the receiving-molds, parts being broken away.

Behind the parts just described there is mounted on the base a stand 10, made of vertical and horizontal portions skeleton-like, although integral, as shown in Figs. 8 and 13. The round hollow column 11 extends upward centrally from said stand 10, as appears in Fig. 8, being integral with the stand. On the shoulder 12 of the stand there rests a bearing-plate 13, upon which rests a downwardly-extending hub of a rotary table 14, which revolves around the hollow column 11 and carries the blow-molds. Under said table 14 there is a gear-wheel 15, which is horizontal and is secured to the downwardly-extending hub of said table 14. The gear 15 is on a level with the gear 5, which carries the receiving-molds and meshes therewith and drives the latter.

Figure 5:
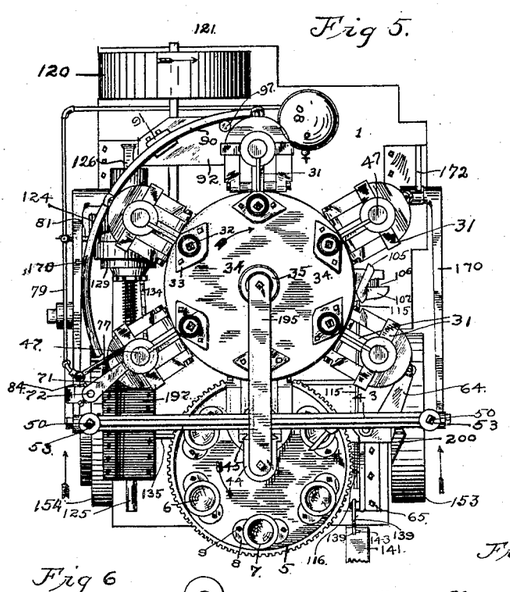
Fig. 5 is a plan view of the machine.
Figure 6:
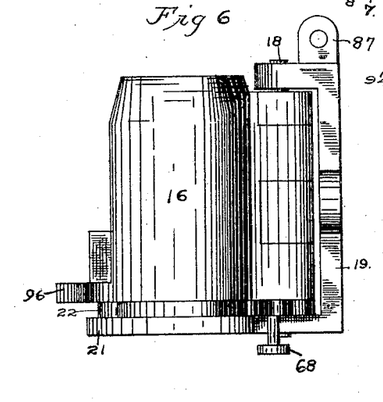
Fig. 6 is a side elevation of a blow-mold and its support.
Figure 7:
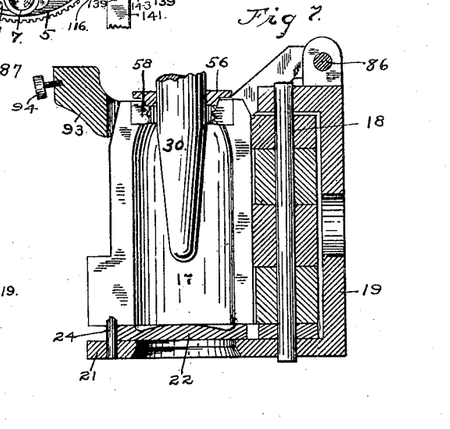
Fig. 7 is a central vertical section through what is shown in Fig. 6 with the yoke in section and with the lower end of a plunger shown in elevation in the mold, the upper end of the plunger being broken away.
Figures 16, 17, 18:
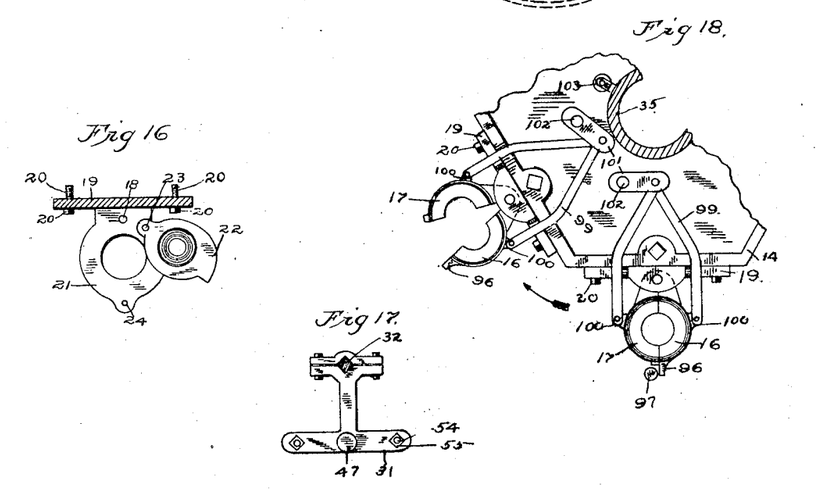
Fig. 16 is a plan view of the bracket or frame carrying the blow-mold with the mold-bottom open.
Fig. 17 is a plan view of the means for carrying each plunger.
Fig. 18 is a plan view of a portion of the table that carries the blow-molds and the parts mounted thereon, one blow-mold shown closed and the other open.

The rotary table carries, preferably, as many blow-molds as there are receiving-molds in the machine, as shown in Fig. 5. Said blow-molds are illustrated in Figs. 6 and 7. They consist of two halves 16 and 17, hinged to the rod 18, that is secured in the frame 19, which is secured to the periphery of the rotary table 14 by screws 20. (Seen in Figs. 3 and 16.) The frame 19, which carries the molds, is vertical, and a horizontal base 21 extends from the lower end thereof, with an opening in it registering with the opening in the bottom of the mold-sections 16 and 17 when they are closed. 22 is the mold-bottom, as shown in place in Fig. 7. It is pivoted to the base 21 by the pin 23 to one side of the rod 18, as appears in Fig. 16. The inward-swinging movement of the bottom 22 is limited by the stop 24, that is secured to the base 21 of the bracket 19, as shown in Figs. 7 and 16.

The receiving-molds in their rotation are brought one at a time beneath one of the blow-molds, as appears in Fig. 8, and the construction is such that at each operation of the machine a new receiving-mold is brought beneath a new blow-mold. The receiving-mold having been filled with a charge of glass and having been rotated to a position below a blow-mold is elevated into the blow-mold, the bottom of the blow-mold being at the time removed or swung aside. Each receiving-mold has a headed bolt 25, that in the rotary movement of the receiving-mold enters a corresponding groove or recess in the upper end of the hollow post 26, which at its lower end is secured to a slide 27, that is vertically slidable on the front face of the stand 10, a guide 28 guiding said slide 27 in its movements.

Within the hollow post 26 there is mounted a strong spring 29, resting upon a nut 38, that screws into the bottom of said hollow post. On the upper end of the spring 29 a head 39 rests, with an upward extension from it that enters the T-slot at the upper end of the hollow post and extends slightly above the bottom of said slot. When there is an upward movement of the post 26, the upward extension from the head 39 immediately engages the bottom of the nut 25 on the mold and elevates the receiving-mold until it reaches its limit of movement and seats itself in the blow-mold, and then the head 39 will yield, if there be any further upward movement of the post 26, due to differences in the sizes of the parts or inaccuracy of construction. The tension of the spring 29 can be adjusted by the nut 38.

After a receiving-mold has been elevated into the blow-mold, as appears in Fig. 8, the glass is pressed and partially formed by the plungers 30, carried on the arms 31, that are secured to the guide-rods 32, the upper ends of which are vertically movable in boxes having bearings 33 on the plate 34, that rotates about a stationary column 35, that at its lower end is secured to the hollow column 11. The plate 34 is supported on said column 35 by the shoulder 36, secured to said column. The lower ends of said guide-rods are vertically movable through the table 14 and pass through openings 37 in the gear 15, as seen in Fig. 8. There is a series of plungers 30, one for each blow-mold, and likewise one guide-rod 32 for each plunger. Said plungers are held in elevated position, as seen in the left-hand side of Fig. 8, by rollers 40, that are secured to the guide-rods 32 and ride upon a stationary table 41, that is secured to the column 35. Said table is cut away to form a notch 42 on one side, as shown in Fig. 8, to permit the downward movement of the roller 40, guide-rod 32, and plunger 30 as the latter revolve. The plungers are elevated and depressed by the cross-head 43, that is vertically slidable on the frame 44, which is secured to post 3 and has a guideway 45 on its inner face. The under side of the cross-head 43 is grooved at 46 to receive the head of the screw 47, that extends from the upper end of the plunger 30. Said cross-head is elevated by the rods 50, (seen in Fig. 4,) which extend loosely through the ends of the cross-head and have secured to them adjustable nuts 51 immediately beneath the cross-head, so that as said rods 50 are elevated the cross-head will be elevated, and thereby the plunger. The cross-head and plunger are depressed by gravity and the action of the spring 52, which is on the upper end of each rod 50, with the lower end of the spring pressing downward on the cross-head and the upper end of the spring acting against a nut 53.

Figure 3:
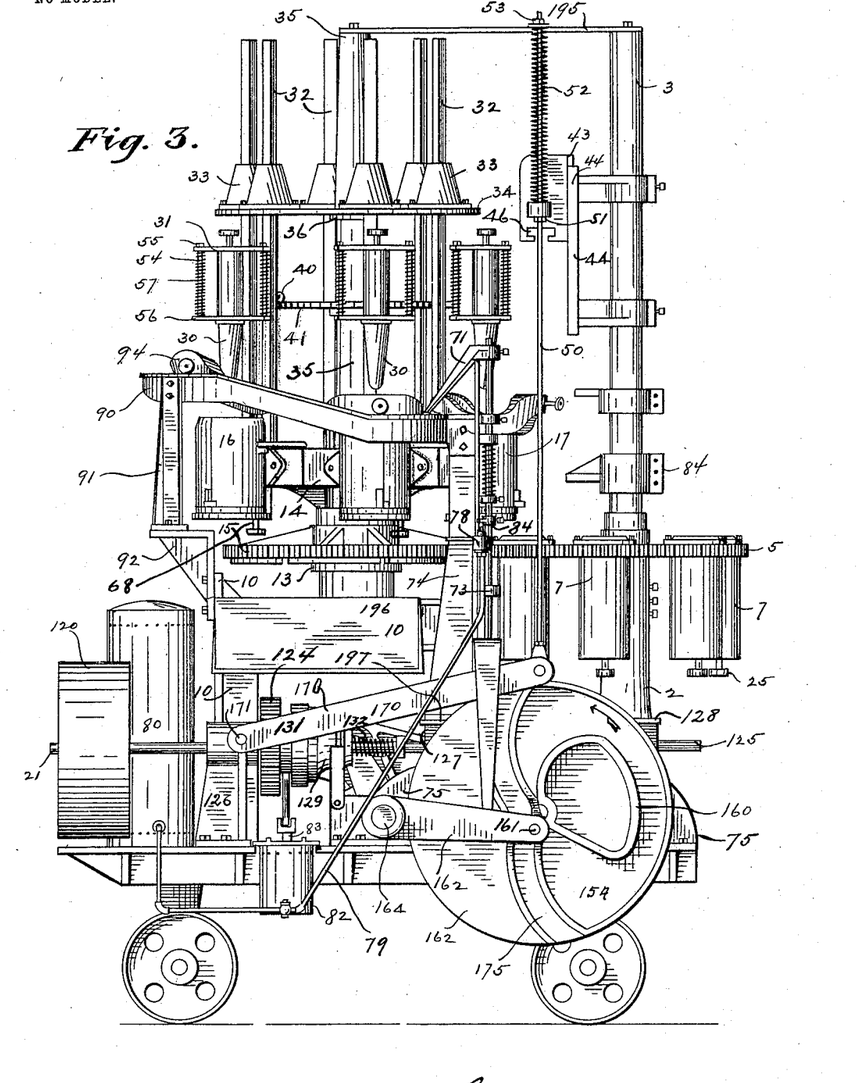
Fig. 3 is a elevation of the left-hand side of the machine.

The bracket 31, to which the upper end of each plunger is secured, is T-shaped, as shown in Fig. 17, so as to have two laterally-extending arms that form practically a bar, as seen in Fig. 3. In each end of said plate 31 there is a sliding rod 54, with a nut 55 on it to limit its downward movement, and said rods at their lower ends are secured to a plunger-ring 56, which surrounds the plunger 30. Said plunger-ring is depressed by the springs 57, that are on the rods 54. The under side of the plunger-ring is formed, preferably, as shown in Fig. 7, with a downward extension that fits into a corresponding seat made in the neck-ring 58 of the blow-mold. This neck-ring and the ring 56 form the upper end of the glass jar. As seen, said ring 56 is yieldingly mounted, and thus provides for the irregular quantities of glass that are fed into the receiving-molds. The neck-ring 58 is made of two semicircular halves, one half secured to the upper end of each mold-section by being seated in a suitable recess therein.

Figure 2:
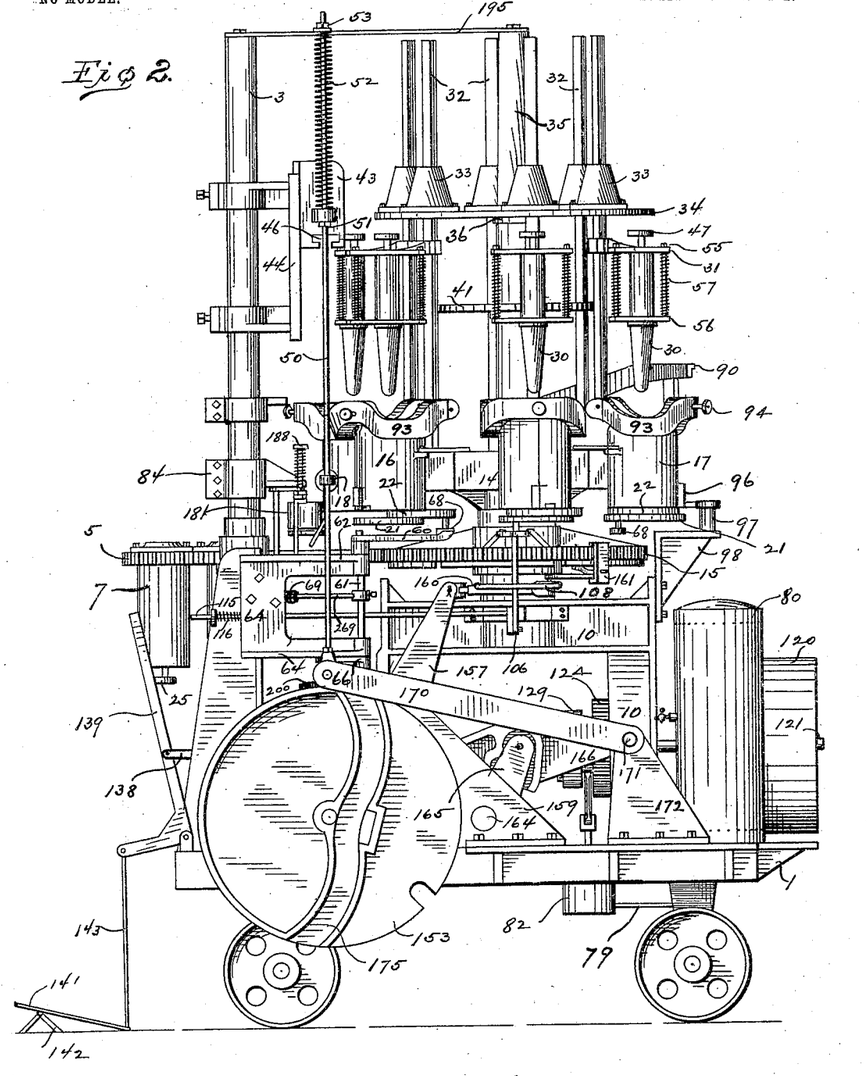
Fig. 2 is an elevation of the right-hand side of said machine.
Figure 9:
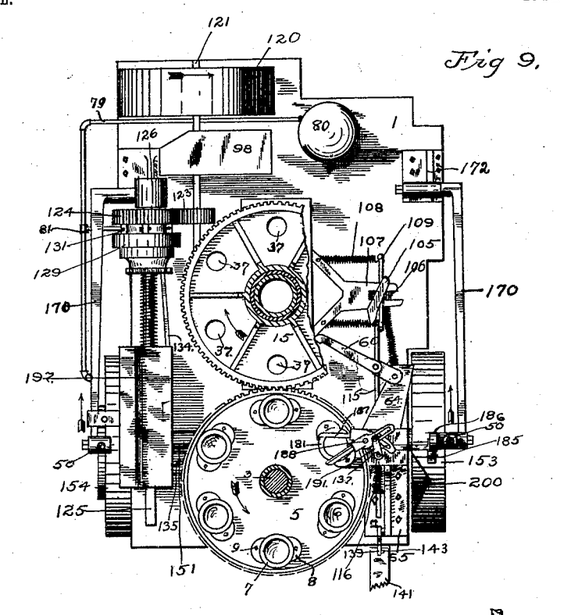
Fig. 9 is a plan view of the lower half of the machine, parts being broken away and others in section, on the line 9 9 of Fig. 8 and looking down from that line.
Figure 10:
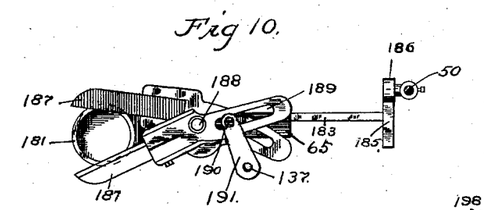
Fig. 10 is a plan view of the knife and means for measuring each charge of glass.
Figure 11:
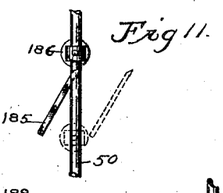
Fig. 11 is an elevation of a part of one of the plunger-actuating rods, showing means for removing the bottom of the measuring vessel.

After the article has been formed by pressing the receiving-mold is moved downward out of the blow-mold, and the partly-formed article is left suspended in the blow-mold. The bottom 22 is then swung into a closed position to close the bottom of the blow-mold by the arm 60, which is to be seen in Figs. 2 and 9, and at one end is secured to the upper end of the shaft 61, which is mounted in a pair of horizontal arms 62 and 63, extending from the plate 64, which is secured to the knife-stand 65. A lever 66 is secured to the lower end of the shaft 61 and has on its outer end a roller 67, that is engaged and moved laterally by means hereinafter to be explained. When said arm 60 is to the rear, as shown in Figs. 2 and 9, it does not engage or actuate the bottom of the blow-mold; but when it is moved forward its inner end engages the roller 68 on the lower end of the bottom 22 of the blow-mold and causes said bottom to close as the blow-mold is further rotated. Said arm 60 is returned to its normal position by a spring 69, connected at one end to the plate 64 (seen in Fig. 2) and at its other end to the arm 269 on shaft 61. As the blow-mold approaches the pressing position the bottom rides over the lever 60 while it is in the position shown in Fig. 9 and remains unclosed until after the pressing and the receiving-mold has been withdrawn, and then the arm 60 is thrown forward by means hereinafter explained and closes the bottom of the mold, whereupon the machine stops.

The rotation of the table 14 carries the blow-mold containing the pressed and partly-finished article from the pressing position to the blowing position. The blowing position is shown at the left-hand in Fig. 5 with the blow-head 70 mounted on the end of the arm 71, that is secured to the upper end of the rod 72, which is vertically slidable in the bearings 73 on the post 74, which is secured to the upper end of the pedestal 75, that is secured to the base of the machine. Said rod 72 and the blow-head are elevated by the bar 201, secured to the lower end of rod 72, and rests upon the lever 162, hereinafter explained, and is depressed by the spring 275 on the rod 72, that is located between the upper bearing 73 and the collar 76. Air is supplied to the blow-head through the air-tube 77, that leads to the same from the valve 78, and the air-tube 79 leads to said valve from the compressed-air tank 80. Intermediate the ends of the tube 79 there is a branch 81 leading therefrom to the cylinder 82 of the air-pump.

83 is the piston-rod of the pump, and when operated said pump compresses air in the tank 80, which is used for blowing glass articles. The air-valve 78 is actuated and opened by the downward movement of the rod 72 inasmuch as the collar 84, secured to said rod, will engage the stem of the air-valve, as seen in Fig. 3. Consequently air will pass through the blow-head when it is down upon the blow-mold. When it is up, the air will be shut off by the valve 78. This feature of the machine is substantially the same as that shown in my last patent above mentioned.

A track 90, circular and horizontally disposed, with a portion of it inclined, is mounted on the support or post 74 at one end, as shown in Fig. 3, and on the support 91, carried by bracket 92, that is secured to the stand 10 of the machine. This is shown also in Fig. 4. After the article has been blown by the means and at the position described, further rotation of the table carrying the blow-mold moves it to the position for opening the mold and removing the finished article.

The mold-sections 16 and 17 are held closed by a yoke 93, that is pivoted at its rear end, and its front end is downwardly movable on each side of or astride the upper part of the blow-mold. The outer end of said yoke carries a roller 94, which is adapted to ride on the track 90, that has been described, and since said track is inclined, after the mold passes the blowing position it will elevate the outer end of the yoke and disengage the yoke from the upper end of the blow-mold sections, so that they may be opened. Such elevated position of the yoke is shown at the left in Fig. 3. The rear end of the yoke is pivoted by a bolt 86 to ears 87 on the upper end of the plate or bracket 19, as appears in Fig. 7. After the mold-sections have been released from the grip of the yoke a lug 96, extending outward from the mold-section 16, engages during the revolution of the mold the roller 97 on the bracket 92, the latter seen in Figs. 2 and 18. The further revolution of the mold causes said section 16 to be turned back, and it causes a similar opening movement of the section 17 by reason of the pivot-links 99. (Seen in Fig. 18.) Said links at their outer ends are pivoted to the ears 100 on the mold-sections and at their inner ends are pivoted together to the lever 101. Said lever is at one end pivoted to the pin 102, that extends upward from the table 14. It is obvious that the backward movement of one of the links 99 by reason of the opening of one section will cause the other link to draw the other section open. Then the finished article remains resting upon the bottom of the mold and can be removed. The further revolution of the molds enables them to cool and they are closed by the inner end of the lever 101 at each revolution coming into engagement with the roller 103, that is secured to the side of the column 35, as seen in Fig. 18.

Before the mold-sections are closed, as has been described, the bottom 22 is moved laterally out of the way by the inclined head 105 (shown in Figs. 2 and 9) coming into engagement with the roller 68, extending down from the bottom of the mold. Said head 105 is secured to the upper end of a vertical bar 106, which is pivoted at its lower end to the lower end of a bracket 107, extending from the frame 10. The upper part or head 105 is held inward yieldingly by the springs 108, that pull inward on lateral extensions 109 from the vertical bar 106. Said extensions are above the pivotal point of said bar 106, so that the springs will hold the bar 106 inward. The vertical bar 106 extends upward through a slot in the outer end of said bracket 107.

In starting a cold mold or if the molds should become too hot the glass is liable to crack or to stick to the mold, as the case may be, so that some small particles of glass will be lodged on the bottom of the mold and interfere with opening the same, and to prevent injury to the mechanism under such circumstances by any positive means for opening the mold the yielding operative means just described are provided. Then it is necessary to clean the particles of glass off the bottom of the mold before further operating the machine. To prevent the person operating the machine from failing to remove such particles of glass from the bottom of the mold, as above described, the following means have been provided, (see Figs. 20 to 22:) The two parallel arms of the bracket 107 and the vertical bar 106, that extends upward between them, have each a hole extending horizontally through the same so placed that such holes register with each other when the bar 106 is at its inner limit of movement, but so that said holes will not register with each other when the upper end of said bar 106 is forced outward by the bottom of the mold being unable to move by reason of the particles of glass. A horizontal rod 115 is mounted with one end in said hole in the bracket 107 and the other end mounted in the knife-stand 65, and a spiral spring 116 on the outer end of said rod tends to draw it outward as far as the stop-collar 117 will permit. When at its outward limit of movement, the inner end of said rod 115 rests in the hole in the left arm of said bracket 107, as appears in Fig. 22, but does not extend through the bar 106. The trip mechanism, hereinafter to be described, which must be operated every time a charge is put into the machine and the machine is thrown into gear, must before it can throw the machine into gear push the rod 115 inward, so that its inner end passes through the bar 106, which it will do if the mold is cleaned, and the bottom can be opened. If for the reason hereinafter described the bottom cannot be entirely opened, said rod 115 cannot be pushed inward, and therefore the trip mechanism cannot be fully operated, and the machine cannot be thrown into gear until the mold is cleaned.

Figure 15:
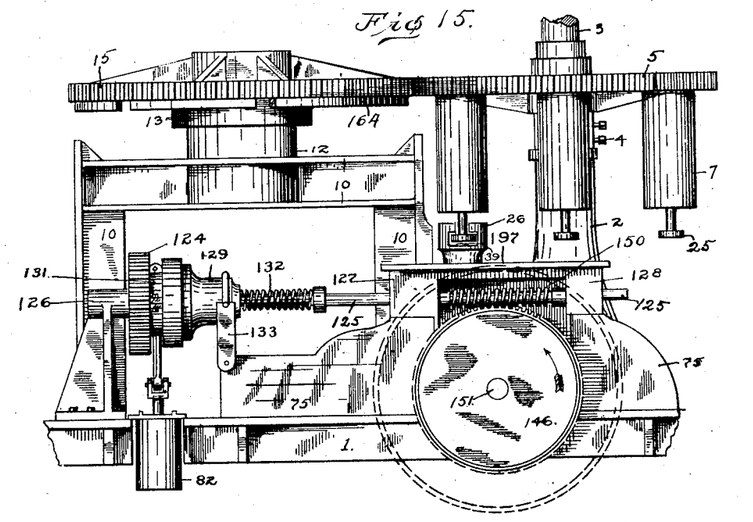
Fig. 15 is a detail drawing showing an elevation of the left-hand side of parts of the framework and means for carrying the molds, the air-pump, and means for throwing the machine into and out of gear, parts being broken away.

The driving mechanism of the machine will now be described. Power from any suitable source is supplied to the pulley 120, mounted on the shaft 121, said shaft having bearings 122 extending from the stands 75 and 126 and carrying the pinion 123, that meshes with the gear 124 on the shaft 125, that is mounted in the bearings 126, 127, and 128. (Shown in Fig. 15.) There is a clutch mechanism 129 on said shaft 25 for throwing the same into and out of gear and an eccentric (not shown) between the gear 124 and the outside of the clutch. On this eccentric there is a ring 131, that is connected with the piston-rod of the air-pump, and by this means said air-pump is driven. The clutch is held in an engaging position by the spring 132 and is moved to an open or released position by the yoke 133, that is fulcrumed on the pedestal 75. Said yoke is actuated by the rod 134, which is pivoted at the lower end to said yoke and at the upper end in a slot in the cross-rod 135, and said cross-rod is in turn pivoted to a lever 136, which is secured rigidly to the knife-rod 137. Said lever is actuated by the rod 138, pivotally connected therewith between its ends, said rod in turn being actuated by the bell-crank 139, fulcrumed at 140 to the knife-stand 65, as appears in Fig. 20. The bell-crank is actuated by a pedal 141, fulcrumed at 142 and pivoted to a connecting-rod 143, that connects with one arm of the bell-crank 139. When the outer end of the pedal is depressed, the upper end of the bell-crank 139 will be thrown toward the machine, which will cause a similar movement of the lever 136, and that will draw the rod 135 and bar 134 toward the right side of the machine, which will cause the lug 144 on the rod 134 to disengage the pin 145 on the worm-gear 146, and then the spring 132 will force the members of the clutch 129 together and the machine will be in operation.

The machine is thrown out of gear at each revolution of the worm-gear 146, which brings the pin 145 thereon into engagement with the lug 144 on the rod 134 and pushes the clutch out of gear. The bell-crank 139, which is actuated by the pedal, has a long upwardly-extending arm which engages the rod 115 and operates it, as has heretofore been described, provided the mold is clean or clear from glass particles and will permit said rod to be pushed inward by the bell-crank 139.

Figures 14, 19:
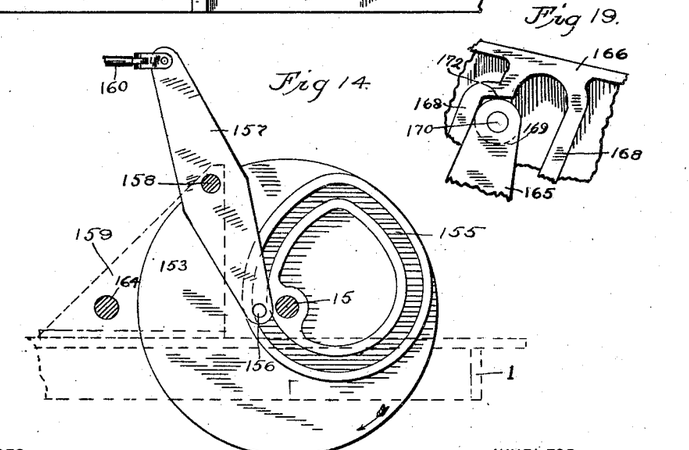
Fig. 14 is an elevation of the inside of the cam that actuates the means for carrying the blow-molds and some connected parts, parts being in section and parts in dotted lines.
Fig. 19 is an outside elevation of a portion of the lever that elevates the receiving - molds and the means for actuating said lever and to hold it in its upper position, parts being broken away.

If said rod cannot be pushed inward, for the reason heretofore explained, the bell-crank 139 cannot be operated sufficiently far to cause the lug 144 on the bar 134 to disengage the pin 135 on the worm-gear 146, and the machine will still remain inoperative until the mold is cleaned The molds and their carrying means are caused to revolve by the means shown in Fig. 14, which shows in elevation the inside of the cam-wheel 153, having a cam-groove 155, in which a pin 156 moves, said pin being secured to the lever 157, fulcrumed at 158 in the stand 159, secured to the base of the machine, which appears in Figs. 13 and 14. The lever 157 has pivoted to its upper end a toggle 160, that at its other end is pivoted to a rocker-arm 161, which has an extension upward, with a hook or inwardly-extending flange, to ride on the gear-wheel 15. A pawl 162 is pivoted to said rocker-arm and pressed upward into engagement with the under side of the gear-wheel 15 by the spring 163. The under side of the gear-wheel 15 is provided with downward extensions 164 to form notches, as shown in Fig. 13. This driving mechanism, including the pawl 162, is by the action of the cam 155 on the wheel 153, reciprocated, and at each forward movement of it the molds are revolved one-sixth of a revolution in the machine herein shown. This driving mechanism is more fully shown and explained in my last patent above mentioned. The rotation of the wheel 15, as has been explained, causes the revolution of both the receiving and blow molds.

Figure 1:
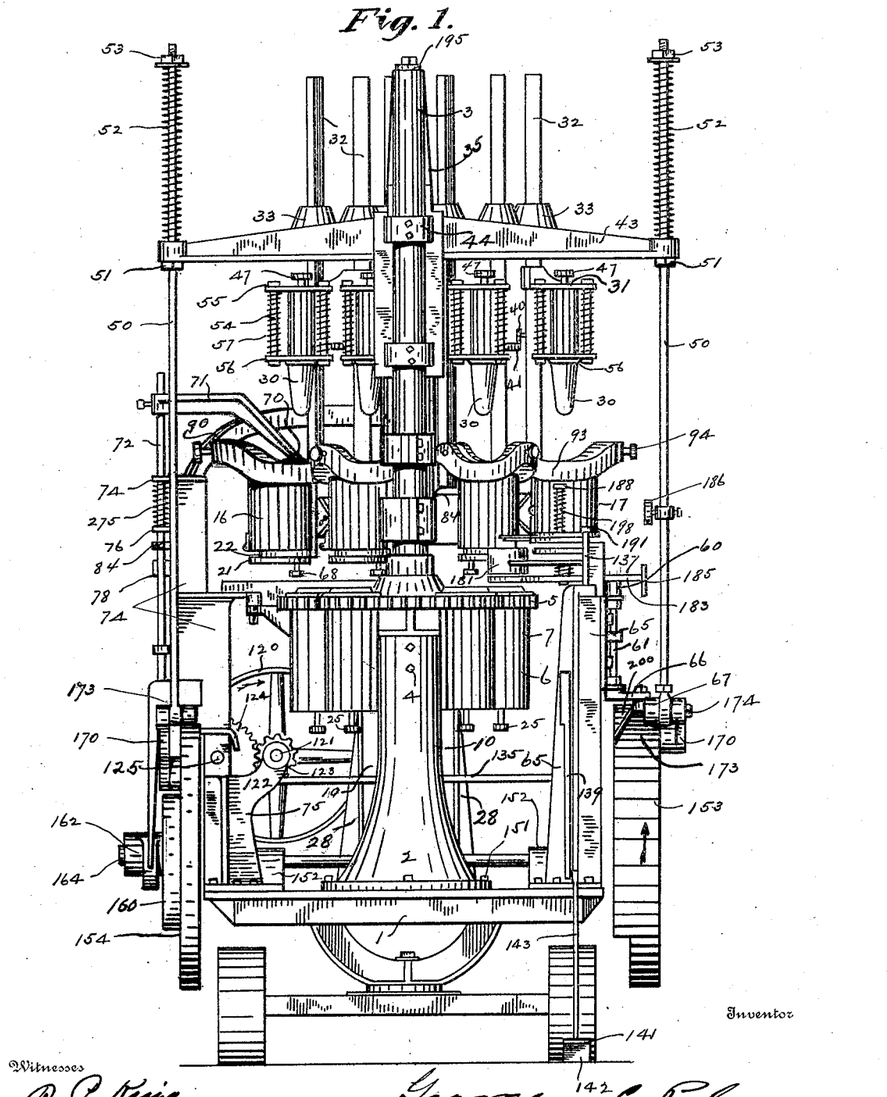
Figure 1 is a front elevation of said machine.

The receiving-mold is moved upward into the outer mold by the cam 160 on the cam-wheel 154. (Seen in Fig. 3.) The cam 160 extends rather far away from the body of the cam-wheel 154, as seen in Fig. 1, and actuates a pin or roller 161, extending inward from the lever 162, that is secured rigidly to the shaft 164, mounted in the stand 159, as seen in Figs. 13 and 14, and 127, as seen in Fig. 3. This part of the mechanism appears also well in Fig. 8, where there is shown within the machine a lever 165, secured to said shaft. There are two of these levers 165, parallel and similarly secured to the shaft 164, one of said levers extending on each side of the raising-lever 166. (Shown in Fig. 13.)

The raising-lever 166 is fulcrumed at 167 to the frame of the machine and near its middle portion has on each side a laterally-extending rib or surface 168, forming a recess or groove in which a roller 169, (shown by dotted lines,) carried on the pin 170, secured in the end of the lever 165, loosely fits and operates. The upper end of the recess is curved, and the width of the recess is substantially the same as or slightly larger than the diameter of the roller. Said recess is inclined, and likewise the ribs 168, as shown in Fig. 13, so that the movement of the upper ends of the levers 165 to the left from the position shown in Fig. 13 will cause the elevation of the left-hand end of the lever 166 to the position shown in dotted lines, and since the left-hand end of the lever 166 carries a roller 171, that works loosely in the slide 27, said slide will be elevated, and thereby the receiving-mold moved up into the blow-mold. When the levers 165 have been moved to the left to their limit, the rollers 169 will move into a notch under a square shoulder 172 in the rib 168 to the left of the recess in the lever 166, as seen in Fig. 19, so that said shoulder will rest on the roller 169 and nearly in line with the pivotal center of said roller and the shaft 164, so as to resist the downward pressure or thrust of the plunger during the pressing operation. The reverse movement of the levers 165 will cause the rollers 169 to engage the inclined surface of the rib 168 at the right-hand side of the recesses in the lever 166, and thereby said lever 166 and the receiving-mold will be forced downward.

Figure 4:
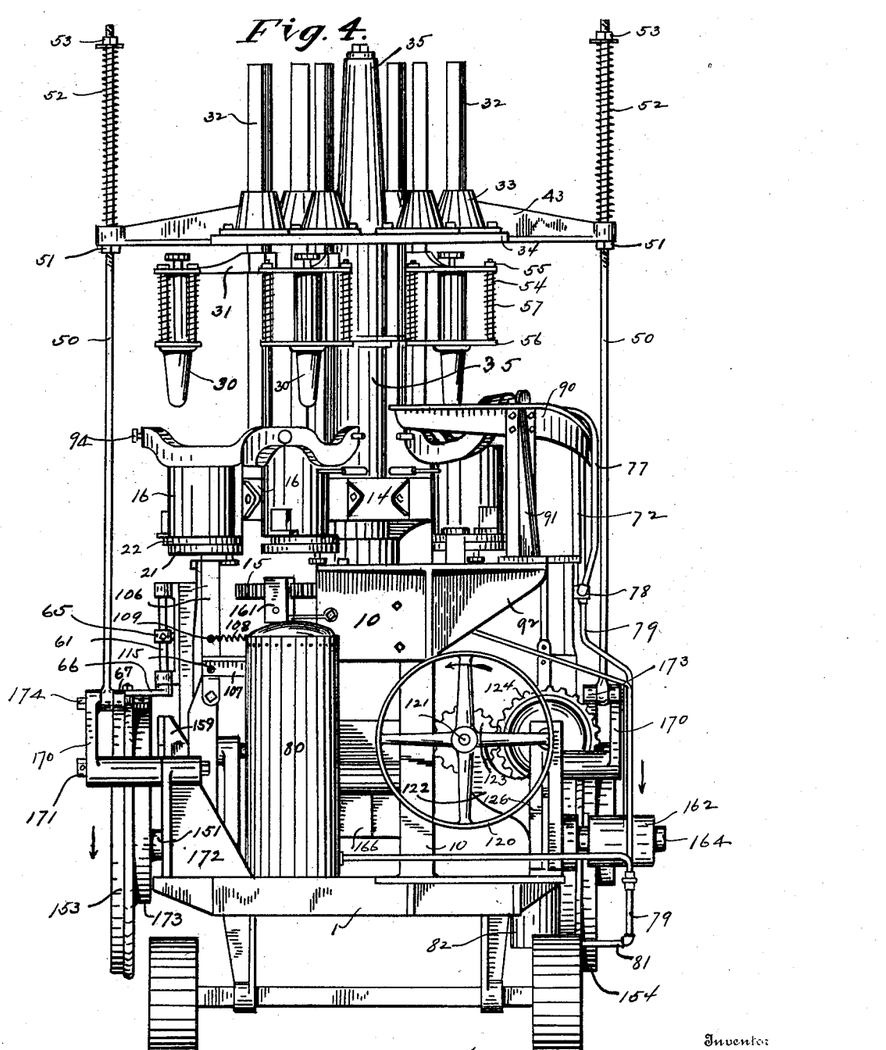
Fig. 4 is a rear elevation of the machine.

The cross-head 43, which moves the plungers 30 up and down, is actuated by the following mechanism, operating through the rods 50, (shown in Figs. 1 and 4:) The construction is the same on each side of the machine and will be understood from inspection of Figs. 2, 3, and 4. The lower ends of the rods 50 are pivotally connected with the levers 170, that are fulcrumed at 171 to the stands 172 and 126, respectively, near the rear side of the machine. A roller 173 is carried on the pin 174, and said roller operates in the cam-groove 175, (shown on the outer face of the cam-wheel 153,) and a similar groove, shown in the outer face of the cam-wheel 154. Rather, it runs through that groove during the depression of the plunger and runs on the periphery of the cam-wheel during the elevation of the plunger. This part of the mechanism is substantially the same as that shown and described in my last patent referred to above.

The cam-wheel 153 has on its periphery, as seen in Figs. 2 and 9, a lug 200, inclined on its side, that engages the roller 67 on the lever 66 to actuate the arm 60 (seen in Fig. 9) for closing the mold-bottom immediately after the pressing operation.

Figures 20, 21, 22:
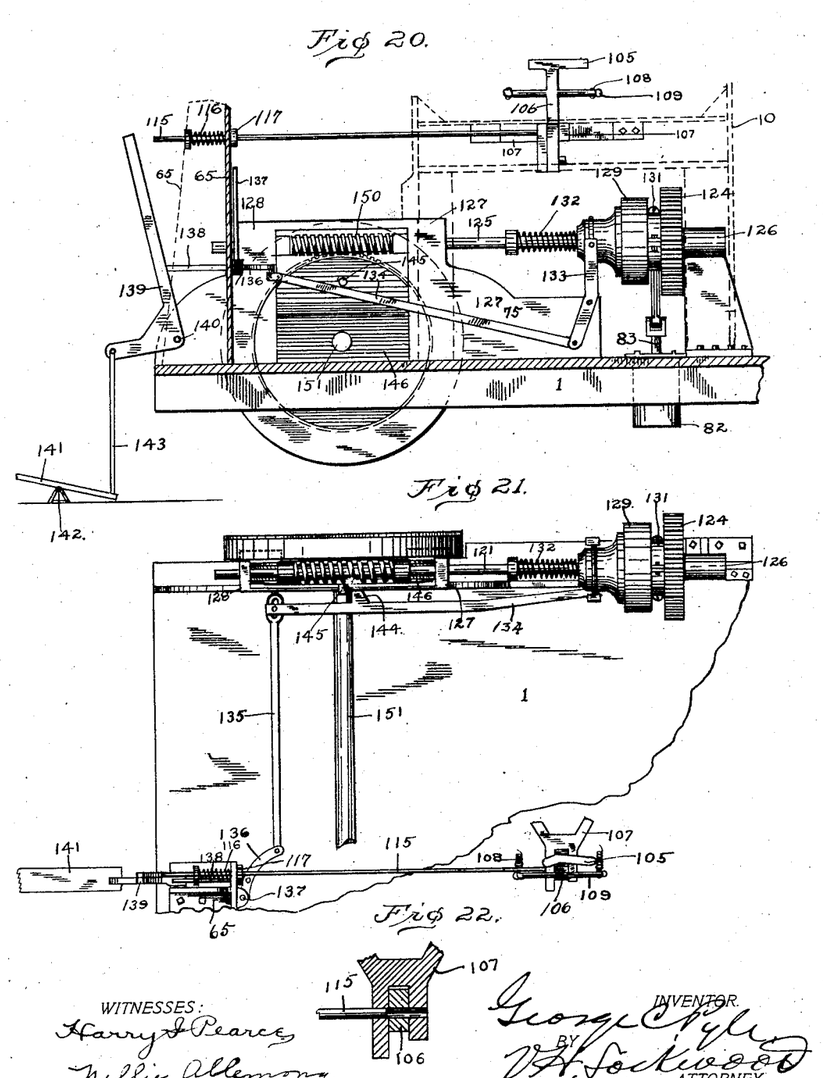
Fig. 20 is an elevation of the right-hand side of the machine, showing certain parts thereof, parts being removed, others in sections and dotted lines.
Fig. 21 is a plan view of the base of the machine with some of the parts mounted thereon, such as are shown in Fig. 20, parts being broken away.
Fig. 22 is a horizontal section of the part shown at the lower right-hand corner of Fig. 21, being a part of the means for preventing the machine from being thrown into operation when any of the blow-molds are not free from glass.

The means for cutting off the proper amount of glass at each charge of the receiving-mold—in other words, the knife mechanism—will now be explained. This will be understood from Figs. 1 and 9 to 12 of the drawings. The knife-post 65 has secured to its upper end the horizontally-extending arm 180, which carries on its outer end a measuring cup or vessel 181 immediately over the path of the receiving-molds and in position where the receiving-molds are stopped by the machine for charging with glass. Said measuring vessel has a removable bottom 182 carried on the lever 183, pivotally mounted to the pin 184, extending downward from the arm 180. On the outer end of said lever 181 there is an inclined bar 185, which is in position to be engaged and actuated by a roller 186, secured on the vertically-movable plunger-rod 50, so that when said rod 50 is depressed by the means heretofore explained the lever 183 will be actuated and the bottom 182 removed from the measuring vessel 181 to permit the glass to be deposited in the receiving-mold. The bottom 182 is returned into position under the measuring vessel after the rod 50 has been elevated by a spring 194, that is mounted on the pin 184. The surplus of glass deposited in the measuring-cup 181 is cut off by the knives 187, pivoted together like shears on the bolt 188. Said knives consist of a casting or shank portion and blades removably secured to said shanks. Each shank has a slot 189, through which a pin 190 from a lever 191 extends, and said lever is rigidly secured to the knife-rod 137, which is shown also in Figs. 19 and 20. The partial rotation of the knife-rod 137 is caused by the movement of the lever 136, as shown in Fig. 20, so the lever 191, just referred to, will operate said knives and open and close the same. Since the knives are operated indirectly by the pedal 141 and the means for throwing the machine into gear, they will cut off the surplus of glass immediately preceding the beginning of the machine's operation.

Figure 12:
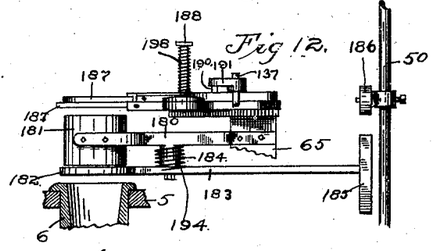
Fig. 12 is a front elevation of the upper part of the receiving-mold, the measure above it, and the knife above the measure, and the means for mounting and actuating the same, parts being broken away.

The knives are held together tightly by a spring 198 on the pivot-pin 188, which extends up above the knives and has a head on the upper end of it, as shown in Fig. 12, so that the spring pressing against the head at the upper end of the pivot and against the upper knife at the lower end causes the knives to fit closely together and make a clean cut. This precedes the movement of the bottom 182 from the measuring vessel 181, and the movement of the latter is simultaneous with the operation of the plunger for pressing, because the rod 50 is a common means for actuating both the plunger and movable bottom 182.

I provide a bar 195 at the top of the machine for tying in place the post 3 and the hollow column 35, as shown in Fig. 8. I also provide an apron 196 (seen in Fig. 3) under the path of the blow-molds in order, when the finished article is being removed, to protect the working parts of the machine below from particles of glass. Said apron is secured to the frame 10. There is also a plate 197, (shown in Figs. 9 and 15,) secured to the bearings 127 and 128, over the worm on the shaft 121 to cover and protect it.

By reason of the slot in the end of the bar 135 the mechanism actuated by the pedal actuates the knife for cutting off the surplus charge of glass before the machine is tripped into operation. In other words, the curved lever 136 (shown in Fig. 20) makes a considerable movement, enough to permit the actuation of the knife, before the trip-lever 134 is operated at all.

The mode of operation will now be explained. A boy brings a charge of molten glass and places it in the measuring vessel 181. He then operates the pedal 141, which causes the knives to cut off the surplus glass, and the machine starts operation, so that the molds revolve one-sixth of a revolution. When a receiving-mold is in position under a blow-mold and is moved up into it for the operation of the plunger and pressing, another receiving-mold will be under the measuring-cup 181, and as the plunger is operated downward the glass will be discharged from the measuring vessel 181 into the receiving-mold beneath it, and this operation is repeated with every charge of glass.

The operation of the machine, aside from the matter referred to, is the same as that set forth in my last patent above mentioned, and for that reason a full description of the operation is omitted.

What I claim as my invention, and desire to secure by Letters Patent, is—

1. In a machine for making hollow glassware, a mold for receiving the glass to be treated, a measuring vessel, means for supporting said vessel immediately above said mold, a removable bottom for said vessel, mechanism for tripping the machine into operation, and means controlled by said tripping mechanism for moving the bottom from under the vessel to discharge the contents thereof into the mold.

2. In a machine for making hollow glassware, a mold for receiving the glass to be treated, a measuring vessel, means for supporting said vessel immediately above said mold, a removable bottom for said vessel, a lever pivoted to said supporting means by which said bottom is carried and moved, means for actuating said lever for removing said bottom, and a spring for closing said bottom.

3. In a machine for making hollow glassware, a series of molds, means for revolving said molds intermittently, a plunger for pressing the glass in said molds mounted immediately over the line of movement of the molds, a measuring vessel mounted immediately over the line of movement of said molds and provided with a removable bottom, and a common means for actuating said plunger and removing said bottom.

4. In a machine for making hollow glassware, a revolving series of molds to receive the glass to be treated, a stand extending up beside the path of said molds, a measuring vessel to receive the initial charge of glass, means extending from said stand for holding said measuring vessel immediately above the path of the molds, a removable bottom for said measuring vessel, a knife mechanism mounted upon said stand immediately above said measuring vessel, and means for actuating said knife for cutting off the surplus glass and removing said bottom.

5. In a machine for making hollow glassware, a trip-lever for throwing the machine into and out of operation, a stop for holding said trip-lever in position to hold the machine out of operation, a knife mechanism for cutting off the surplus charge of glass, a pedal-actuated mechanism for operating said knife, a crank actuated by the knife mechanism, and a slotted connection between said pedal-actuating mechanism and said trip-lever whereby said knife mechanism would have some operation before said trip-lever is actuated and the machine thrown into operation.

6. In a machine for making hollow glassware, a mold, a lever fulcrumed at one end, means actuated by the other end for elevating said mold, a downwardly-movable plunger for pressing the glass in the mold when in its elevated position, and means for elevating said lever, said lever being provided with a longitudinally-extending flat-faced shoulder that rests upon said means for elevating the lever when the lever is in its upper position, whereby said lever can resist the downward thrust of the plunger.

7. In a machine for making hollow glassware, a mold, a lever fulcrumed at one end, means actuated by the other end for elevating said mold, a downwardly-movable plunger for pressing the glass in the mold when in its elevated position, said lever having on its side a laterally-extending rib or extension that is inclined and leaves an inclined recess in the side of the lever substantially as shown, the extension or flange on one side of said recess having a shoulder that has a flat downwardly-extending face, a shaft with a crank thereon, a roller mounted in the end of said crank that fits in said recess and operates against said flanges for elevating and depressing said lever, said shaft, crank, and shoulder being so mounted and of such length that the roller will ride under the shoulder on the lever when the lever is in its elevated position, and the downward pressure of the lever will be nearly in line with the center of said roller and said shaft, whereby the downward thrust of the plunger will be resisted by said roller, crank, and shaft.

8. In a machine for making hollow glassware, a blow-mold, a receiving-mold that is vertically movable into the blow-mold, a hollow post beneath the receiving-mold, a spring-supported head within said hollow post with an extension upward to engage the lower part of the receiving-mold, and means for elevating said hollow post, whereby the means elevating the receiving-mold will yield after the mold reaches its limit of movement.

9. In a machine for making hollow glassware, a blow-mold, a receiving-mold vertically movable into said blow-mold having a headed bolt extending downward from the bottom thereof, a hollow post below said mold with an inverted T-shaped slot in the upper end thereof to receive said headed bolt, an adjustable spring mounted in said hollow post, a head upon the upper end of said spring with an extension into the T-shaped groove, and means for elevating said hollow post.

10. In a machine for making hollow glassware, a revolving table for carrying a series of blow-molds and having near to each mold a hole extending through it, a column extending upwardly therefrom, a plate on said column near the upper end with a number of holes extending through it that register with the holes in the rotary table below, plunger-carrying rods mounted in the holes in said revolving table and plate, and means for vertically reciprocating said plunger-carrying rods.

11. In a machine for making hollow glassware, blow-molds, receiving-molds, a lever for lifting said receiving-molds into the blow-molds, said lever being fulcrumed at one end and intermediate its ends having on its side a pair of flanges or extensions forming a recess, said flanges and recess being inclined, a shaft, and a crank on said shaft provided with a roller on its end that fits in said recess and acts against the inclined faces of said flanges or extensions on said lever for elevating or depressing it.

12. In a machine for making hollow glassware, revolving blow-molds, a bottom for each blow-mold pivoted so as to be movable into and out of place, a roller extending downward from said bottom, a horizontally-movable lever adapted to engage said roller and close said bottom, a cam-wheel connected with the driving parts of the machine with an inclined lug on the periphery thereof, intermediate connections between said lever and cam-wheel, and a spring for returning said lever after operation to its normal position.

13. In a machine for making hollow glassware, a revolving mold with a removable bottom pivoted to be moved laterally into and out of place, a vertically-extending lever one end of which is adapted to engage and open said bottom as the mold revolves, a stop for limiting the movement of said lever toward the mold-bottom, and a spring tending to resist the movement of said lever away from the mold-bottom.

14. In a machine for making hollow glassware, a mold revolving about a vertical axis, a mold-bottom pivoted so as to be movable into and out of place, a plate below the line of movement of the mold provided with a guiding-slot extending radially from the center of revolution of the mold, a lever fulcrumed below said plate and extending upward through said slot with its upper end in position to engage and open said mold-bottom as the mold revolves, and a spring for resisting the outward movement of the upper end of said lever.

15. In a machine for making hollow glassware, a revolving mold with a mold-bottom pivoted to be moved into and out of closing position, means for starting the machine into operation, and means controlled by the opening of said mold-bottom for preventing the actuation of said starting means, whereby the machine cannot be started unless the bottom of the mold has been opened.

16. In a machine for making hollow glassware, a revolving blow-mold with a bottom pivoted to be moved into and out of position, means for opening said bottom after the finished article has been removed from the mold, means for starting the machine into operation, and a connection extending between said means for opening the bottom of the mold and said means for starting the machine into operation which will prevent the actuation of the latter when the mold-bottom cannot be opened.

17. In a machine for making hollow glassware, a revolving blow-mold with a bottom pivoted to be movable into and out of position, a lever in position to open said mold-bottom, means for starting the machine into operation, and a rod for preventing the complete actuation of the starting means, the movement of which rod is controlled by said lever for opening the mold-bottom.

18. In a machine for making hollow glassware, a revolving blow-mold with a bottom pivoted so as to be movable into and out of position, a spring-controlled lever held by the spring in position to engage and open said mold-bottom if the same can be readily opened and which will be pushed backward by said mold-bottom if the same cannot be readily opened, a rod mounted to be longitudinally movable only when said lever is in its normal position, and means for starting the machine into operation which engages said rod to move it longitudinally before the machine is thrown into operation, whereby the machine cannot be thrown into operation if said lever has been forced by the mold-bottom out of its normal position.

19. In a machine for making hollow glassware, a revolving mold having the bottom pivoted to be movable into and out of closing position, a lever extending upward into position to engage and open the mold-bottom, a spring for holding it normally in its inward position, a plate adjacent said lever, said plate and lever being each provided with an opening through them in line with each other when the lever is in its normal position, a longitudinally-movable rod with one end mounted in the opening in said plate, a spring for holding said rod normally out of the opening through said lever, a bell-crank lever with one arm adapted when operated to engage and force said rod through the opening in said lever when the lever is in its normal position, means for actuating said bell-crank lever, and means actuated by said bell-crank lever in the latter part of its movement for throwing said machine into operation.

In witness whereof I have hereunto affixed my signature in the presence of the witnesses herein named.

GEORGE C. PYLE.

Witnesses:
V. H. LOCKWOOD,
NELLIE ALLEMONG.